United States Patent
Goldberg et al.

(10) Patent No.: US 8,890,086 B1
(45) Date of Patent: Nov. 18, 2014

(54) ION DETECTOR RESPONSE EQUALIZATION FOR ENHANCED DYNAMIC RANGE

(71) Applicant: Agilent Technologies, Inc., Loveland, CO (US)

(72) Inventors: Noah Goldberg, Palo Alto, CA (US); James L. Bertsch, Palo Alto, CA (US); David Deford, Pleasanton, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 13/920,405

(22) Filed: Jun. 18, 2013

(51) Int. Cl.
  *H01J 49/40* (2006.01)
  *G01T 1/29* (2006.01)

(52) U.S. Cl.
  CPC .. *H01J 49/40* (2013.01); *G01T 1/29* (2013.01)
  USPC .......... 250/397; 250/281; 250/282; 250/297; 250/299; 702/107; 702/64

(58) Field of Classification Search
  CPC ... H01J 49/025; H01J 49/027; H01J 49/0027; H01J 49/065; H01J 43/246; H01J 43/30; H01J 37/244
  USPC ................. 250/281, 287, 282, 397, 283, 299; 702/107, 64
  See application file for complete search history.

(56) References Cited

U.S. PATENT DOCUMENTS

| | | | | |
|---|---|---|---|---|
| 4,195,222 A * | 3/1980 | Fouilloy | ................... | 250/214 VT |
| 4,804,891 A * | 2/1989 | Sweeney | ....................... | 315/383 |
| 4,814,963 A * | 3/1989 | Petersen | ......................... | 363/20 |
| 4,814,965 A * | 3/1989 | Petersen | ......................... | 363/65 |
| 5,326,978 A * | 7/1994 | Aebi et al. | ..................... | 250/397 |
| 5,360,976 A * | 11/1994 | Young et al. | .................. | 250/287 |
| 5,367,222 A * | 11/1994 | Binkley | ....................... | 315/12.1 |
| 5,374,826 A * | 12/1994 | LaRue et al. | .................. | 250/397 |
| 5,463,220 A * | 10/1995 | Young et al. | .................. | 250/288 |
| 5,591,969 A * | 1/1997 | Park et al. | ...................... | 250/287 |
| 5,614,711 A * | 3/1997 | Li et al. | ......................... | 250/287 |
| 5,777,325 A * | 7/1998 | Weinberger et al. | ........... | 250/287 |
| 5,866,901 A * | 2/1999 | Penn et al. | ..................... | 250/281 |
| 6,045,677 A * | 4/2000 | Beetz et al. | ..................... | 205/50 |
| 6,617,768 B1 * | 9/2003 | Hansen | .................. | 313/103 CM |
| 6,670,606 B2 * | 12/2003 | Verentchikov et al. | ....... | 250/287 |
| 6,747,271 B2 * | 6/2004 | Gonin et al. | ................... | 250/281 |
| 6,800,847 B2 * | 10/2004 | Axelsson | ....................... | 250/281 |
| 7,047,144 B2 * | 5/2006 | Steiner | ............................ | 702/64 |

(Continued)

OTHER PUBLICATIONS

Fraser, "The ion detection efficiency of microchannel plates (MCPs)", International Journal of Mass Spectrometry 215, 13-30 (2002).

*Primary Examiner* — David A Vanore

(57) ABSTRACT

An ion detection system for detecting ions whose velocity varies during an operating cycle. The ion detection system includes a dynode electron multiplier (e.g., a microchannel plate (MCP)) having a bias voltage input, and a bias voltage source to apply a bias voltage to the bias voltage input of the dynode electron multiplier. With a fixed bias voltage applied to its bias voltage input, the dynode electron multiplier has a gain dependent on the velocity of ions incident thereon. The bias voltage applied by the bias voltage source to the bias voltage input of the dynode electron multiplier varies during the operating cycle to reduce the dependence of the gain of the dynode electron multiplier on the velocity of the ions incident thereon.

20 Claims, 7 Drawing Sheets

(56) References Cited

U.S. PATENT DOCUMENTS

| | | | |
|---|---|---|---|
| 7,105,807 B2 * | 9/2006 | Hansen | 250/283 |
| 7,238,936 B2 * | 7/2007 | Okamura et al. | 250/284 |
| 7,476,850 B2 * | 1/2009 | Oonishi et al. | 250/287 |
| 7,667,195 B2 * | 2/2010 | Vestal | 250/287 |
| 7,745,781 B2 * | 6/2010 | Steiner | 250/282 |
| 7,855,361 B2 * | 12/2010 | Steiner | 250/292 |
| 8,110,801 B2 * | 2/2012 | Indermuehle et al. | 250/311 |
| 8,507,845 B2 * | 8/2013 | Blick et al. | 250/282 |
| 2009/0294654 A1 * | 12/2009 | Steiner | 250/283 |
| 2011/0240857 A1 * | 10/2011 | Kovtoun et al. | 250/336.1 |
| 2011/0295528 A1 * | 12/2011 | Jourdan | 702/51 |

\* cited by examiner

ION DETECTOR RESPONSE EQUALIZATION FOR ENHANCED DYNAMIC RANGE

BACKGROUND

Ion detectors based on a microchannel plate (MCP) or another type of the dynode electron multiplier are used in many applications, for example, as the ion detector of a time-of-flight mass spectrometer. A microchannel plate has an array of continuous-dynode electron multipliers. When an analyte ion is incident on the microchannel plate, the microchannel plate emits secondary electrons that are amplified by a cascade effect. The gain of the amplification depends on a bias voltage applied across the microchannel plate. The amplified electrons are subsequently converted to photons using a scintillator, the photons are converted back to electrons by a photomultiplier tube, and the resulting signal is digitized.

As disclosed in 215 INTERNATIONAL JOURNAL OF MASS SPECTROMETRY 13-30 (2002), the number of secondary electrons emitted in response to an incident ion depends on the velocity of the incident ion. In a time-of-flight mass spectrometer, the velocity of the incident ion is necessarily different for each species that arrives at the ion detector after a respective time of flight. Setting the bias voltage to provide a gain setting that maximizes the gain of the ion detector (and, hence, the detection sensitivity) for slow ions (i.e., ions having high mass-to-charge ratio (m/z)) can lead to reduced dynamic range and saturation in the data acquisition electronics for fast ions (i.e., ions having a low m/z). Furthermore, subjecting other system components to saturated signals can significantly shorten the lifetimes of such system components.

Accordingly, what is needed is an ion detector having a high gain for slow ions but that is not saturated by fast ions.

DETAILED DESCRIPTION

Disclosed herein is an ion detection system for detecting ions whose velocity varies during an operating cycle. The ion detection system includes a dynode electron multiplier (e.g., a microchannel plate (MCP)) having a bias voltage input, and a bias voltage source to apply a bias voltage to the bias voltage input of the dynode electron multiplier. With a fixed bias voltage applied to its bias voltage input, the dynode electron multiplier has a gain dependent on the velocity of ions incident thereon. The bias voltage applied by the bias voltage source to the bias voltage input of the dynode electron multiplier varies during the operating cycle to reduce the dependence of the gain of the dynode electron multiplier on the velocity of the ions incident thereon.

Also disclosed herein is an ion detection system for detecting ions whose velocity varies during an operating cycle. The ion detection system includes an ion detector having a bias voltage input. With a fixed bias voltage applied to the bias voltage input, the ion detector has a gain dependent on the velocity of ions incident thereon. The ion detection system additionally includes a bias voltage source to apply to the bias voltage input of the ion detector a bias voltage that varies during the operating cycle to reduce dependence of the gain of the ion detector on the velocity of the ions incident thereon.

Figure 1A:
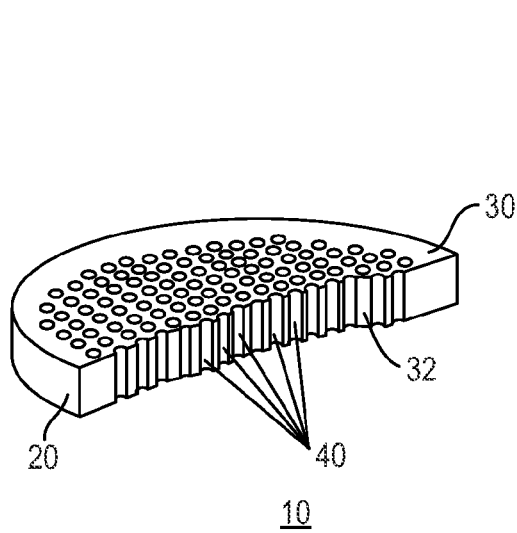
FIGS. 1A and 1B are schematic drawings showing an example of a microchannel plate (MCP) as an example of a continuous-dynode electron multiplier.
Figure 1B:
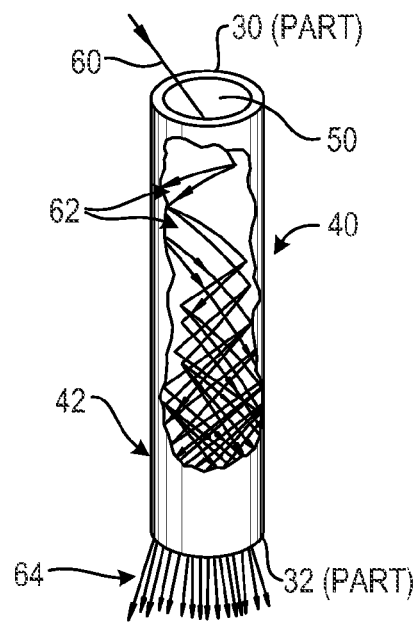

FIGS. 1A and 1B are schematic drawings showing an example 10 of a microchannel plate (MCP) as an example of a continuous-dynode electron multiplier. Referring first to FIG. 1A, microchannel plate 10 is based on an insulating substrate 20. In an example, substrate 20 is a wafer of glass less than 1 mm thick. A front electrode 30 and a back electrode 32 are located on respective ones of the opposed major surfaces the substrate. Cylindrical channels 40 extend through the thicknesses of substrate 20 and electrodes 30, 32.

FIG. 1B shows an exemplary channel 40 in greater detail. In directions parallel to the major surfaces of substrate 20, channel 40 is bounded by a cylindrical surface 42 of substrate 20. Surface 42 is coated with a thin layer 50 of a semiconductor, for example, semiconducting lead. The opposed ends of semiconductor layer 50 make electrical contact with adjacent parts of electrodes 30 and 32.

Microchannel plate 10 is mounted with front electrode 30 facing the source of ions that microchannel plate 10 is to detect. A bias voltage is applied between electrode 30 and electrode 32 to set electrode 32 to a higher potential than electrode 30. The bias voltage establishes a potential gradient along semiconductor layer 50 between the opposite ends of channel 40. FIG. 1B shows at 60 the track of an ion incident on the semiconductor layer 50 of one of the channels 40. Impact of the incident ion on semiconductor layer 50 releases secondary electrons 62 from the semiconductor layer. The potential gradient accelerates secondary electrons 62 along channel 40 towards back electrode 32. However secondary electrons 62 are incident on at least one other location on semiconductor layer 50 before they reach back electrode 32. Each time secondary electrons 62 are incident on semiconductor layer 50 they release additional secondary electrons from the semiconductor layer and the potential gradient accelerates the additional secondary electrons towards back electrode 32. Most of the secondary electrons pass through back electrode 32 and are output from microchannel plate 10 as output electrons 64. The number of output electrons 64 output from microchannel plate 10 is substantially greater than the number of ions incident on the microchannel plate. The microchannel plate can be regarded as having a gain defined by the number of output electrons 64 output per incident ion.

Figure 2:
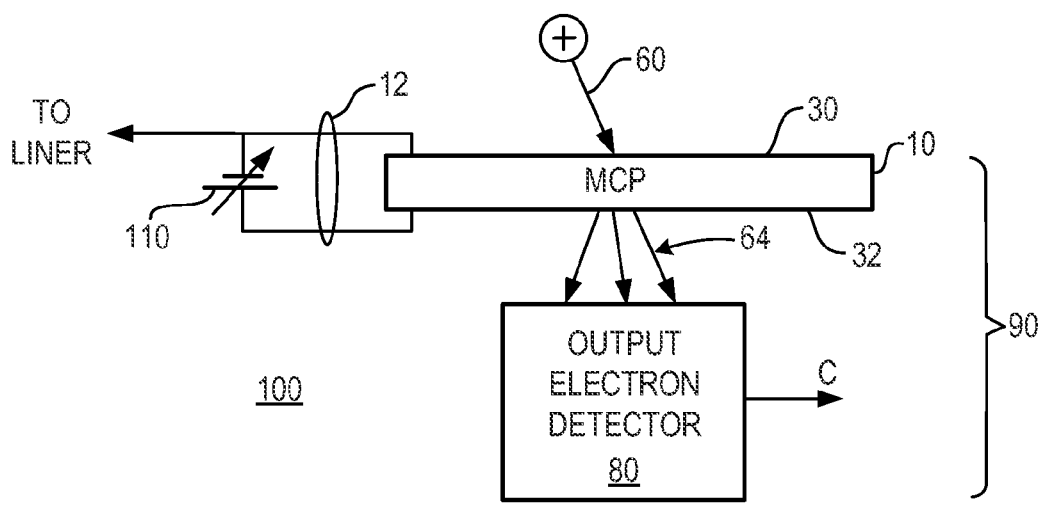
FIG. 2 is a block diagram showing an example of an ion detection system in accordance with this disclosure.

FIG. 2 is a block diagram showing an example 100 of an ion detection system in accordance with this disclosure. Ion detection system 100 includes microchannel plate 10, an output electron detector 80, and a dynamic bias voltage source 110.

Microchannel plate 10 is an example of a dynode electron multiplier. Other examples of a dynode electron multiplier include a discrete dynode electron multiplier and a continuous channel multiplier. In addition, for the purposes of this disclosure, a combination of a conversion dynode and an electron multiplier (such as a microchannel plate), in which the electron multiplier is arranged to receive secondary particles emitted by the conversion dynode in response to ions incident thereon, will be regarded as a dynode electron multiplier.

Microchannel plate 10 includes a bias voltage input 12 that includes respective conductors connected to front electrode 30 and back electrode 32. Another form of dynode electron multiplier may be substituted for microchannel plate 10.

Output electron detector 80 is mounted to receive output electrons 64 output by microchannel plate 10 in response to ions incident thereon. Output electron detector 80 generates a count signal C that represents the number of output electrons 64 from microchannel plate 10 incident on output electron detector 80 per unit time. The number of output electrons 64 incident on output electron detector 80 per unit time is in turn a function of the number of ions incident on microchannel plate 10 per unit time.

Microchannel plate 10 and output electron detector 80 constitute an ion detector 90. Ion detector 90 can be regarded as having a gain defined by the level (if analog) or value (if digital) of count signal C output in response to a defined number of ions incident on microchannel plate 10.

Dynamic bias voltage source 110 is connected to the bias voltage input 12 of microchannel plate 10 in a way that connects the negative terminal of the dynamic bias voltage source to front electrode 30 that faces the host mass spectrometer (not shown) or other source of ions that ion detection system 100 is to detect, and connects the positive terminal of the dynamic bias voltage source to back electrode 32, opposite front electrode 30. The negative terminal of dynamic bias voltage source 110 is additionally connected to the flight liner (not shown) of the host mass spectrometer (not shown) or to another source of the ions 60 incident on microchannel plate 10 so that the front electrode 30 of microchannel plate 10 is at the same electrical potential as the source of the ions. In other examples of ion detection system 100, the negative terminal of dynamic bias voltage source 110 is not connected to the flight liner or to the other source of the ions. Instead the negative terminal of the dynamic bias voltage source connected to another voltage source (not shown) that sets the negative terminal of the dynamic bias voltage source to a voltage that is typically equal to, but may be different from (e.g., less than), that of the flight liner or other source of the ions.

As noted above, with a constant bias voltage applied between front electrode 30 and back electrode 32, the gain of microchannel plate 10 depends on the velocity of the ions.

Figure 3:
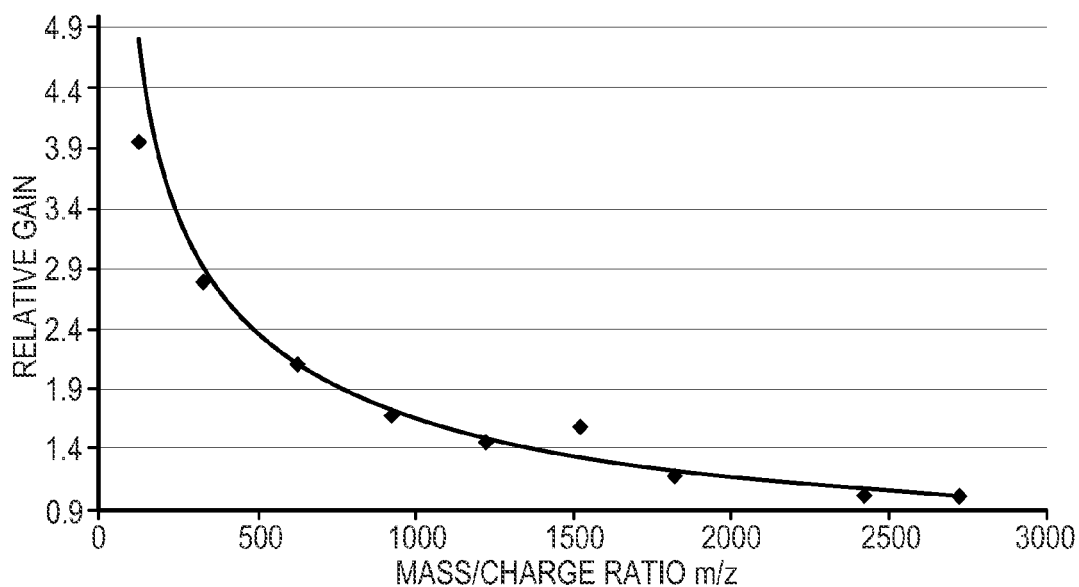
FIG. 3 is a graph showing the dependence of the relative gain of an example of a microchannel plate on the velocity of the incident ions.

FIG. 3 is a graph showing the dependence of the relative gain of an example of microchannel plate 10 on the mass-to-charge ratio m/z of the incident ions measured using a time-of-flight mass spectrometer in which the velocity of the ions incident on the microchannel plate is proportional to $1/\sqrt{m/z}$ of the ions. Thus, the mass-to-charge ratios marked along the y-axis of the graph represent corresponding reciprocals of the square of velocity of the incident ions. The discrete points are measured data points. The continuous curve is a theoretical gain characteristic of the microchannel plate based on a linear relationship between the relative gain of the microchannel plate and the velocity of the incident ions. The gain for the ion species having m/z 2722, the ion species having the higher mass and thus the lower sensitivity, was defined as unity gain. Ion detectors based on other types of dynode electron multipliers have gains that depend similarly on the velocity of the incident ions.

Figure 4:
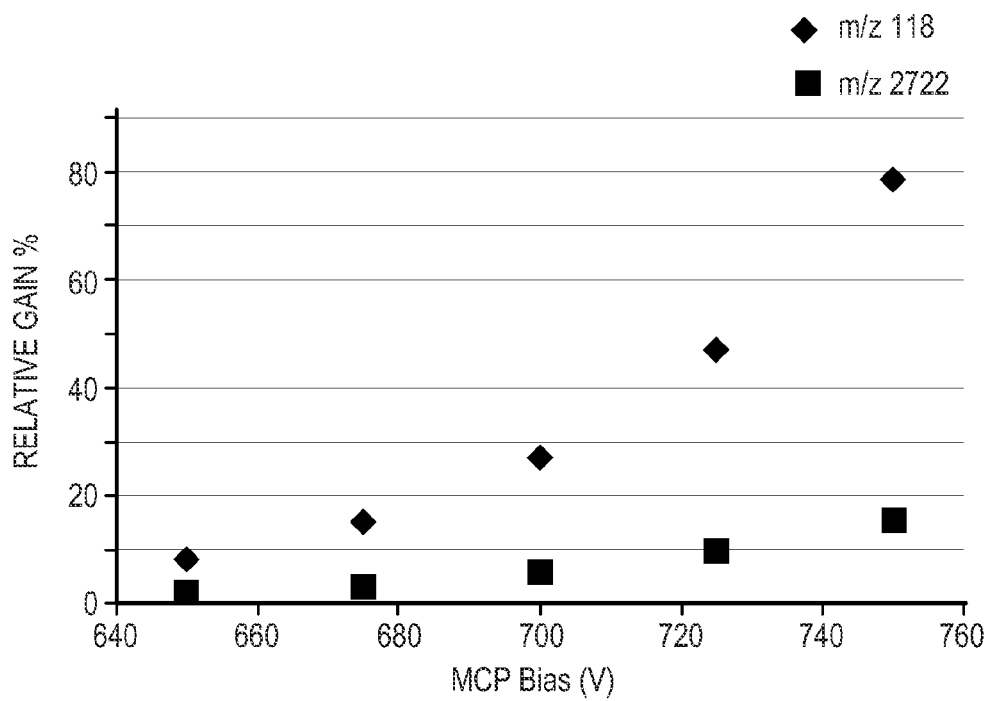
FIG. 4 is a graph showing the dependence of the relative gain of an example of a microchannel plate 10 on bias voltage.

Additionally, for ions of a given mass-to-charge ratio incident thereon, the gain of microchannel plate 10 depends on the bias voltage applied between front electrode 30 and back electrode 32. FIG. 4 is a graph showing the dependence of the relative gain of an example of microchannel plate 10 on the bias voltage applied between electrodes 30 and 32 for two different types of incident ions having respective mass-to-charge ratios m/z of 118 and 2722. The gain of the microchannel plate increases exponentially with increasing bias voltage over a typical range of the bias voltage until the gain begins to saturate at high bias voltages. The gain characteristics shown in FIG. 4 indicate that a 35 V change in the bias voltage changes the gain of the microchannel plate by a factor of approximately two.

In a typical application, ion detection system 100 is used to detect ions output by a host time-of-flight mass spectrometer. In a time-of-flight mass spectrometer, a sample is ionized and a batch of the resulting ions is subject to an electrical transient that accelerates each ion to a velocity inversely dependent on the mass-to-charge ratio of the ion. The ions are directed through a field-free region towards ion detection system 100 located at a distal end of the field-free region. In the field-free region, the different velocities of the ions separate the ions of different mass-to-charge ratio from one another in the direction of travel of the ions so that most of the ions arrive at ion detection system 100 in inverse order of their velocities and, hence, in order of their mass-to-charge ratios. After a time sufficient for the slowest ions of interest to arrive at ion detection system 100, another batch of ions derived from the sample is subject to a transient that accelerates them towards ion detection system 100. The time between successive transients of the host mass spectrometer defines the operating cycle of ion detection system 100 in this application. Operating cycles can be defined for other applications in which ions are incident on ion detection system 100 in a predictable order of velocity during each operating cycle.

Figure 5:
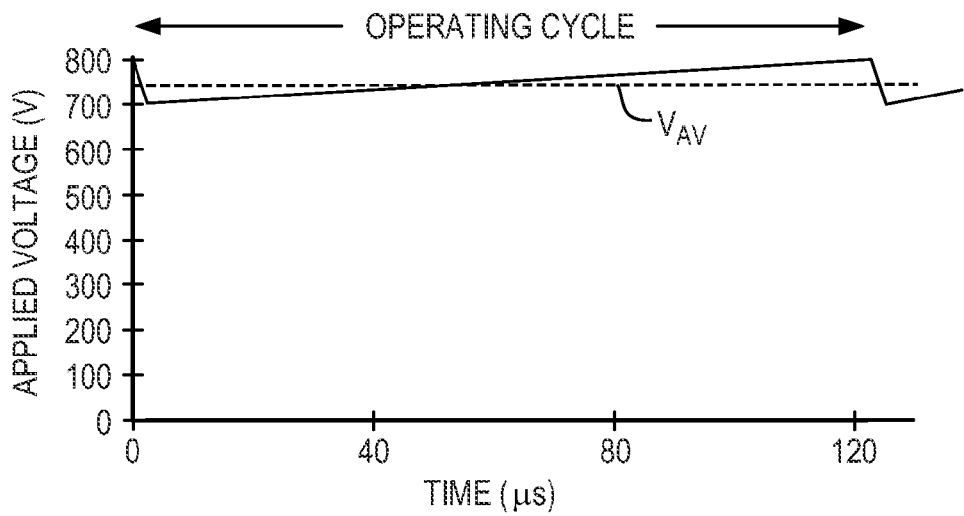
FIG. 5 is a graph showing an example of the voltage waveform applied to the microchannel plate by an example of a dynamic bias voltage source.

In an example, a first order reduction in the dependence of the gain of ion detection system 100 on the velocity of the ions incident on microchannel plate 10 is provided by an embodiment of dynamic bias voltage source 110 that applies to bias voltage input 12 a bias voltage that varies during each operating cycle during which ion detection system 100 detects ions. In an example, the bias voltage increases linearly from a minimum level with increasing acquisition time (proportional to $\sqrt{m/z}$) during each operating cycle. FIG. 5 is a graph showing an example of the voltage waveform applied to microchannel plate 10 by an example of dynamic bias voltage source 110. The applied voltage shown in FIG. 5 is the voltage on electrode 32 relative to the voltage on electrode 30 of microchannel plate 10.

In the example shown, at the start of the operating cycle, the applied voltage quickly resets to its minimum level of approximately 700 V. The applied voltage then increases linearly during the operating cycle to a maximum of about 800 V at the end of the operating cycle. The applied voltage then falls quickly back to minimum level at the beginning of the next operating cycle. In other examples, one or more of the value of the average voltage, the portion of the operating cycle during which the applied voltage returns to its minimum level, the amplitude of the voltage increase during the operating cycle, the time-dependence of the voltage increase during the operating cycle (e.g., the voltage may increase non-linearly), and the duration of the operating cycle differ from those illustrated.

The varying bias voltage applied by dynamic bias voltage source 110 to microchannel plate 10 during each operating cycle substantially reduces the dependence of the gain of microchannel plate 10 on the velocity of the ions incident thereon. Accordingly, instead of the gain of the microchannel plate decreasing with acquisition time during each operating cycle as the velocity of the incident ions falls during each operating cycle, the varying bias voltage equalizes the gain of microchannel plate 10 during the operating cycle to provide a gain that remains substantially constant during the operating cycle. One benefit of microchannel plate 10 having a substantially constant gain over the operating cycle is an increase of 2-4 times in the dynamic range of ion detection system 100 for ion species having a low m/z (e.g., ion species having m/z<600).

Additionally, equalizing the gain of ion detection system 100 for different ion species can lead to improvements in quantitation. Equalizing the gain of ion detection system 100 for different ion species can improve quantitation for low-mass ions at the high limit of concentration and/or for high-mass ions at any concentration. Low-mass ions of high enough concentration to saturate a conventional ion detection system without gain equalization cannot be quantitated as accurately as they would be from the unsaturated signals output by ion detection system 100. Similarly, the higher gain of ion detection system 100 with respect to high-mass ions enables the quantitation of signals that would be undetectably small with the lower gain of the conventional ion detection system. Typically, the gain of ion detection system 100 is set to allocate these competing benefits in a way that achieves a desired performance specification.

The dynamically varying bias voltage reduces the gain of the microchannel plate during the time that high-abundance, low m/z, contaminant ions are incident thereon. In embodiments in which output electron detector 80 includes a scintillator (described below with reference to FIG. 6), the large numbers of output electrons generated by the microchannel plate in response to such contaminant ions can significantly reduce the lifetime of the scintillator. Reducing the production of output electrons in response to such contaminant ions can significantly decrease this impairment of the lifetime of the scintillator.

Not all of the above-described benefits are necessarily obtained in all applications.

Other types of dynode electron multiplier can be regarded as having a bias voltage input corresponding to bias voltage input 12 of microchannel plate 10 to which dynamic bias voltage source 110 can be connected to vary the bias voltage applied to the dynode electron multiplier during each operating cycle to substantially reduce the dependence of the gain of dynode electron multiplier on the velocity of the ions incident thereon.

Figure 6:
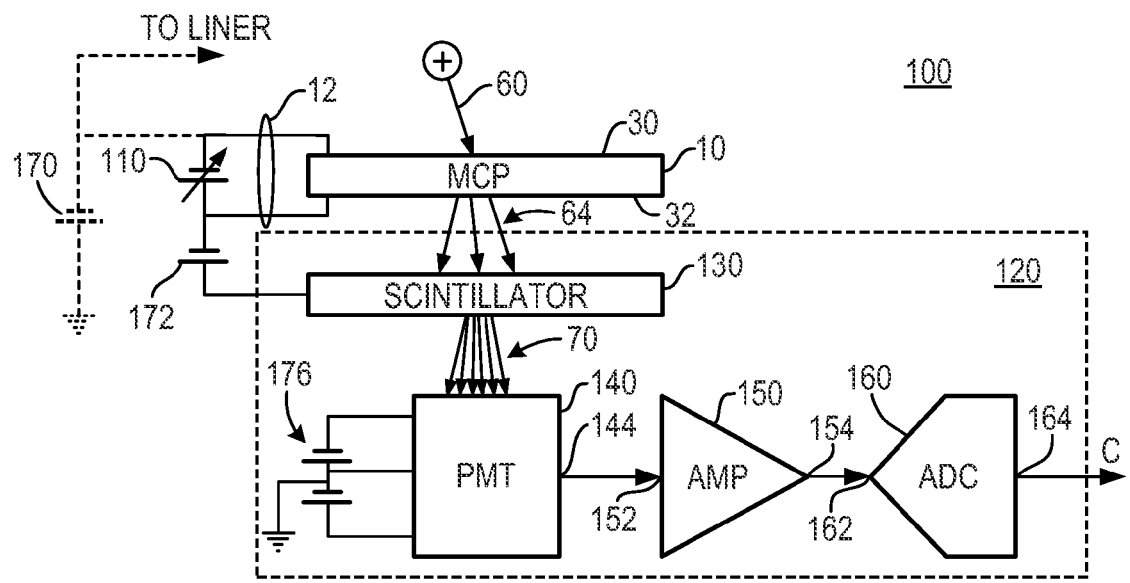
FIG. 6 is a block diagram showing an example of the output electron detector of an ion detection system.

FIG. 6 is a block diagram showing an example of the output electron detector 80 of ion detection system 100. In the example shown, output electron detector 80 includes a scintillator 130, a photomultiplier tube (PMT) 140, a preamplifier 150, and an analog-to-digital converter (ADC) 160.

Scintillator 130 is disposed relative to microchannel plate 10 such that output electrons 64 output by the microchannel plate are incident on the scintillator. Output electrons 64 incident on scintillator 130 cause the scintillator to output photons 70. Photomultiplier tube 140 is disposed relative to scintillator 130 such that photons 70 are incident on the photomultiplier tube.

Photomultiplier tube 140 has a signal output 144 at which it outputs a signal having a level dependent the intensity of photons 70 incident thereon. Preamplifier 150 has a signal input 152 and a signal output 154. Signal input 152 is connected to the signal output 144 of photomultiplier tube 140. Preamplifier 150 amplifies the signal received from photomultiplier tube 140 to generate an amplified signal. ADC 160 has an analog input 162 and a digital output 164. Analog input 162 is connected to receive the amplified signal from the signal output 154 of preamplifier 150. ADC 160 digitizes the amplified signal received from preamplifier 150 and outputs the resulting count signal C at digital output 164.

Some embodiments of output electron detector 80 include an additional preamplifier (not shown) in series with an additional ADC (not shown), and a selector circuit connected to the outputs of ADC 160 and the additional ADC. The additional preamplifier has a lower gain than preamplifier 150 and has an input connected to the signal output 144 of photomultiplier tube 140. The selector selects the output of the additional ADC when the output of ADC 160 saturates. This increases the dynamic range of output electron detector 80 and, hence, of ion detection system 100.

Also shown in FIG. 6 is a liner bias supply 170, a scintillator supply 172 and a photomultiplier tube bias supply 176. Liner bias supply 170 is typically part of the host mass spectrometer (not shown) to which ion detection system 100 is coupled and defines the potential of the flight liner (not shown) of the host mass spectrometer. In the example shown, the positive terminal of liner bias supply is connected to ground. The negative terminal of liner bias supply 170 is connected to the front electrode 30 of microchannel plate 10 and to the flight liner so that front electrode 30 is at the same potential as the flight liner. The output voltage of a typical embodiment of liner bias supply 170 is 6 kV.

In the example shown in FIG. 6, the negative terminal of scintillator supply 172 is connected to the positive terminal of dynamic bias voltage source 110 and to the back electrode 32 of microchannel plate 10. The positive terminal of the scintillator supply is connected to scintillator 130. The voltage provided by scintillator supply 172 establishes an electric field between back electrode 32 and scintillator 130 that accelerates the output electrons 64 output by microchannel plate 10 towards scintillator 130. The output voltage of a typical embodiment of scintillator supply 172 is 5 kV. Photomultiplier tube bias supply 176 supplies voltages to the electron multiplication stages within photomultiplier tube 140.

Figure 7:
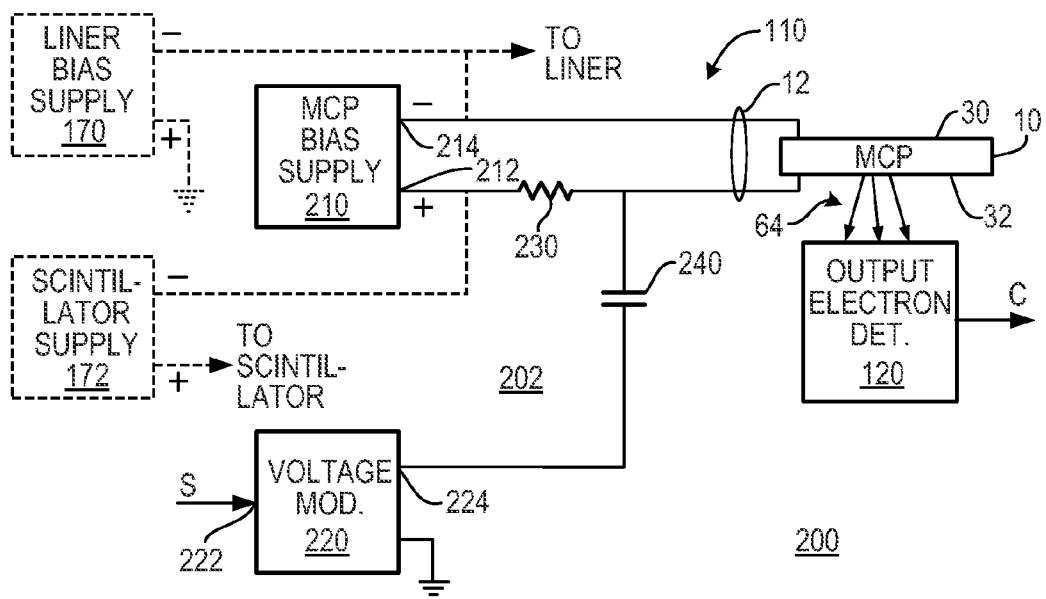
FIG. 7 is a block diagram showing an example of an ion detection system having a capacitor-coupled dynamic bias voltage source.

FIG. 7 is a block diagram showing an example 200 of an ion detection system incorporating an example 202 of a dynamic bias voltage source configured to apply a voltage waveform similar that shown in FIG. 5 to the bias voltage input 12 of microchannel plate 10. Dynamic bias voltage source 202 includes an MCP bias supply 210, a voltage modulator 220, a resistor 230, and a coupling capacitor 240.

MCP bias supply 210 has a positive terminal 212 and a negative terminal 214. Negative terminal 214 is connected to the front electrode 30 of microchannel plate 10 via the bias voltage input 12 of the microchannel plate. Negative terminal 214 is additionally connected to the negative terminal of liner bias supply 170 and to the flight liner (not shown) of the host mass spectrometer (not shown). Resistor 230 has a value of several megohms and couples the positive terminal 212 of MCP bias supply 210 to the back electrode 32 of microchannel plate 10 via the bias voltage input 12 of microchannel plate. In other examples, the negative terminal of MCP bias supply 210 is not connected to the flight liner. Instead, the negative terminal of the MCP bias supply is connected to another voltage source (not shown) that sets the negative terminal of the MCP bias supply to a voltage that is typically equal to, but may be different from (e.g., less than), that of the flight liner.

Voltage modulator 220 has a sync input 222 and a modulation signal output 224. Sync input 222 is connected to receive a synchronization signal S from the host mass spectrometer. The synchronization signal synchronizes the operating cycle of dynamic bias voltage source 202 to the transients of the host mass spectrometer.

Coupling capacitor 240 has a voltage rating greater than the output voltage of liner bias supply 170 and is connected between modulation signal output 224 and the bias voltage input 12 of microchannel plate 10. Voltage modulator 220 generates voltage modulation waveform that, when imposed by capacitor 240 on the substantially constant DC voltage output by MCP bias supply 210 through resistor 230 applies the desired varying voltage waveform to the back electrode 32 of microchannel plate 10. Thus, MCP bias supply 210 defines the average DC voltage $V_{AV}$ of the applied voltage waveform shown in FIG. 5 and voltage modulator 220 imposes the voltage variation shown in FIG. 5 on the average voltage.

In some embodiments, voltage modulator 220 is configured to generate an output waveform having the peak-to-peak amplitude (e.g., approximately 100 V peak-to-peak) of the varying portion of the applied voltage waveform shown in FIG. 5. In other embodiments, voltage modulator 220 includes a modulation signal generator and an amplifier connected in series. The modulation signal generator generates a small-amplitude modulation voltage waveform with the temporal characteristics of the varying component of the applied voltage waveform shown in FIG. 5. The amplifier amplifies the small-amplitude modulation voltage waveform to a large-amplitude modulation voltage waveform having the peak-to-peak amplitude of the varying component of the applied voltage waveform shown in FIG. 5.

In some embodiments of dynamic bias voltage source 202, such as the embodiment used to generate the waveform example shown in FIG. 5, a sawtooth generator is used as voltage modulator 220. In other embodiments, a voltage modulator capable of generating a nonlinearly-varying output waveform is used as voltage modulator 220 to enable dynamic bias voltage source 202 to generate a non-linearly varying bias voltage.

The positive terminal 212 of MCP bias supply is additionally connected to the negative terminal of scintillator supply 172. Referencing scintillator supply 172 to MCP bias supply 210 instead of to the back electrode 32 of microchannel plate 10 reduces the capacitative loading on back electrode 32, which makes it easier to apply the varying voltage to back electrode 32. The varying voltage on back electrode 32 varies the voltage between back electrode 32 and scintillator 130, but since the voltage variations on back electrode 32 (approximately 100 V) are small compared with the DC voltage (approximately 5 kV) between back electrode 32 and scintillator 130, the resulting changes in the gain of scintillator 130 can be ignored.

Figure 8:
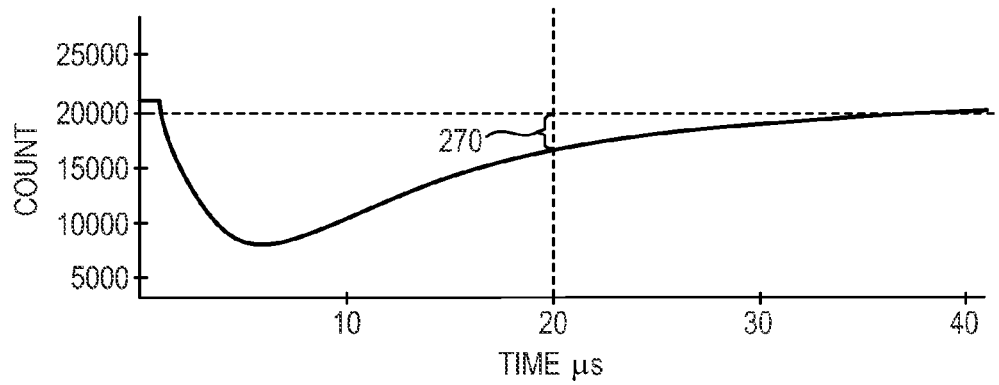
FIG. 8 is a graph showing the effect of applying the voltage waveform exemplified in FIG. 5 on the baseline of an ion detection system.

FIG. 8 is a graph showing the effect of applying the waveform exemplified in FIG. 5 on the baseline of ion detection system 200. Only the first 40 µs of the 140 µs-long operating cycle between consecutive transients are shown. The axis labeled count shows the number of counts recorded by ion detection system 200 during a total of 6727 transients of the host mass spectrometer to which ion detection system 200 is coupled and 6727 operating cycles of ion detection system 200. The term count refers to the sum of the digital values output by ADC 160 (FIG. 6) during the 6727 operating cycles, and not to a count of individual ions. The axis labeled time indicates time from the beginning of each transient. The discontinuity that occurs when the varying bias voltage is reset to its lowest level at the beginning of the operating cycle induces a broadly-peaked artifact which takes more than 10 µs to decay. However, at 20 µs, the perturbation 270 of the baseline resulting from the artifact is 20,000−16,000=4000 counts, i.e., 4000/6727=0.6 counts per transient. Increasing the fall time of the varying bias voltage can reduce the amplitude of the artifact. With a typical preamplifier offset (−6 counts per transient), the baseline artifact is not expected to cause major problems, especially since most time-of-flight mass spectrometers have a low-m/z transmission cutoff. In an example, the low-m/z transmission cutoff discards count signals generated in the first 20 is after each transient. The smoothly increasing part of the varying bias voltage (most of which is not shown in FIG. 8) causes very little perturbation of the baseline.

Figure 9:
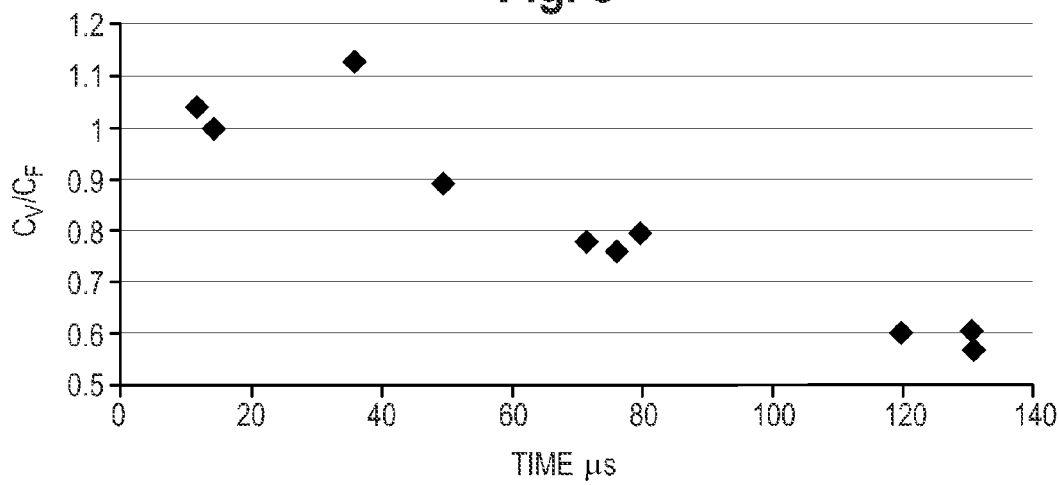
FIG. 9 is a graph showing the temporal variation of a ratio between a count provided by the ion detection system shown in FIG. 7 and a count provided by a conventional ion detector.
Figure 10:
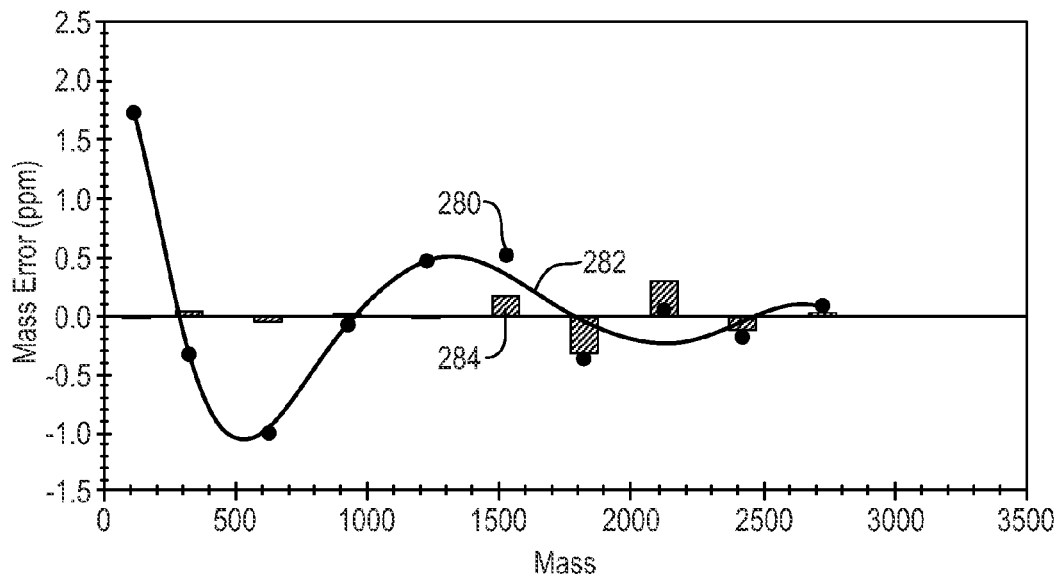
FIG. 10 is a graph showing the result of a mass calibration performed using a conventional ion detection system.
Figure 11:
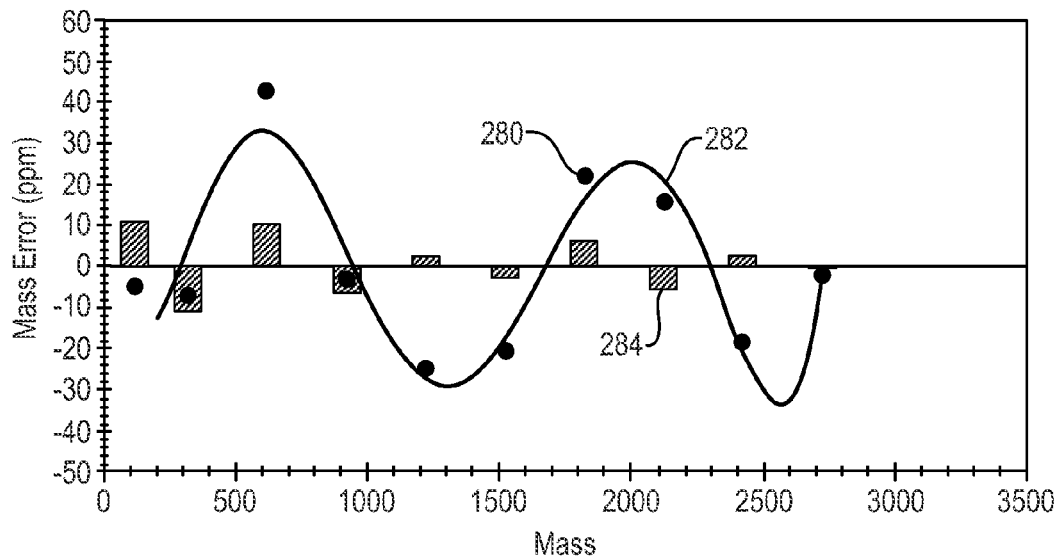
FIG. 11 is a graph showing the result of a mass calibration performed using the ion detection system shown in FIG. 7.

FIGS. 9, 10 and 11 are graphs showing the results of early proof of concept experiments in which a host mass spectrometer (not shown) having an ion detection system coupled thereto was used to measure the mass spectrum of a standard tuning mixture typically used for tuning mass spectrometers. The experiments compared ion detection system 200 having a variable bias voltage waveform inverse to that shown in FIG. 5 applied between the electrodes of its microchannel plate with a substantially-similar, conventional ion detection system having a fixed bias voltage applied between the electrodes of its microchannel plate. The variable bias voltage waveform applied to ion detection system 200 was inverted relative to that shown in FIG. 5 because the proof of concept experiment was conducted on a prototype R&D instrument with a nonstandard configuration. In FIG. 9, the axis labeled $C_V/C_F$ indicates, for each ion species in the tuning mixture, the ratio between the count provided by ion detection system 200 and the count provided by the conventional ion detector. The axis labeled time indicates acquisition time after each transient of the host mass spectrometer. Each of the points of the graph corresponds to a particular ion species of the tuning mixture. It can be seen that, compared with the conventional ion detection system, ion detection system 200 exhibits an approximately 2× reduction in the count over the duration of the acquisition.

FIGS. 10 and 11 show the results of mass calibrations performed using the conventional ion detection system and ion detection system 200, respectively. In each of FIGS. 10 and 11, errors (in parts per million) between the measured mass and the known mass of each ion species in the tuning mixture are shown by points, an exemplary one of which is shown at 280. Each of FIGS. 9 and 10 also show a high-order polynomial mass calibration curve 282 generated from respective points 280. Finally, in FIGS. 10 and 11, the residual errors between the measured masses corrected using the mass calibration curve and the respective known mass are shown by respective bars, an exemplary one of which is shown at 284. In FIG. 10, in which the ions were detected by the conventional ion detection system, the residual errors are less than approximately ±0.3 ppm. In FIG. 11, in which the ions were detected by ion detection system 200, the residual errors are approximately ±10 ppm (note the larger range of the mass error scale in FIG. 11). Thus, the accuracy of the masses measured using ion detection system 200 is approximately 30 times worse than that of the masses measured using the conventional ion detection system.

The lower accuracy of the mass measurements made using ion detection system 200 was thought to be due to perturbations in the voltage of the flight liner of the host mass spectrometer caused by application of the variable bias voltage shown in FIG. 5 to microchannel plate 10. To test this hypothesis, a transformer was used to impose the varying voltage on the DC output of MCP bias supply 210 instead of the RC coupling shown in FIG. 7.

Figure 12:
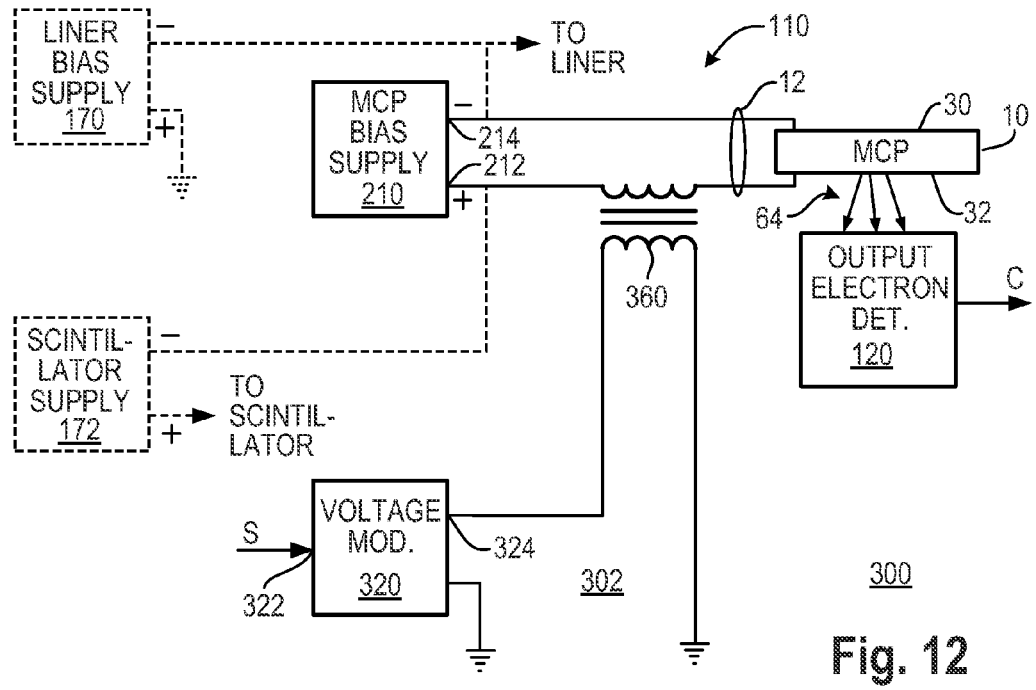
FIG. 12 is a block diagram showing an example of an ion detection system having a transformer-coupled dynamic bias voltage source.

FIG. 12 is a block diagram showing an example 300 of an ion detection system incorporating a transformer-coupled example 302 of a dynamic bias voltage source configured to apply a voltage waveform similar that shown in FIG. 5 to the bias voltage input 12 of microchannel plate 10. Elements of dynamic bias voltage source 302 that correspond to elements of dynamic bias voltage source 202 described above with reference to FIG. 7 are indicated using the same reference numerals and will not be described again in detail. Dynamic bias voltage source 302 includes MCP bias supply 210, a voltage modulator 320, and a transformer 360.

In an example, transformer 360 is a 10:1 step-up transformer having a 25-turn primary winding and a 250-turn secondary winding on a J material part no. 2213 pot core with a two-section bobbin sold by Magnetics, Pittsburgh, Pa. In other examples, transformer 360 differs in step-up ratio and/or structure from those exemplified.

The negative terminal 214 of MCP bias supply 210 is connected to the front electrode 30 of microchannel plate 10 via the bias voltage input 12 of the microchannel plate. Negative terminal 214 is additionally connected to the negative terminal of liner bias supply 170 and to the flight liner (not shown) of the host mass spectrometer (not shown). The secondary of transformer 360 couples the positive terminal 212 of MCP bias supply 210 to back electrode 32 of microchannel plate 10 via the bias voltage input 12 of the microchannel plate. Positive terminal 212 is additionally connected to the negative terminal of scintillator supply 172. In other examples, the negative terminal of MCP bias supply 210 is not connected to the flight liner. Instead, the negative terminal of the MCP bias supply is connected to another voltage source (not shown) that sets the negative terminal of the MCP bias supply to a voltage that is typically equal to, but may be different from, that of the flight liner.

Voltage modulator 320 has a sync input 322 and a modulation signal output 324. Sync input 322 is connected to receive a synchronization signal S from the host mass spectrometer. The synchronization signal synchronizes the operating cycle of dynamic bias voltage source 302 to the transients of the host mass spectrometer.

The modulation signal output 324 of voltage modulator 320 is connected to ground through the primary winding of transformer 360. Voltage modulator 320 generates waveform that, when interposed by transformer 360 on the DC voltage output by MCP bias supply 210 produces the desired voltage waveform on the back electrode 32 of microchannel plate 10. Thus, MCP bias supply 210 defines the average voltage of the applied voltage waveform shown in FIG. 5 and voltage modulator 320 imposes the variation shown in FIG. 5 on the average voltage. Voltage modulator 320 generates a small-amplitude modulation voltage waveform with the temporal characteristics of the varying component of the applied voltage waveform shown in FIG. 5. Using a step-up transformer as transformer 360 increases the amplitude of the small-amplitude modulation voltage waveform generated by voltage modulator 320 to a large-amplitude modulation voltage waveform having the peak-to-peak amplitude (e.g., approximately 100 V peak-to-peak) of the varying component of the applied voltage waveform shown in FIG. 5.

In some embodiments of dynamic bias voltage source 302, a sawtooth generator is used as voltage modulator 320. In other embodiments, a voltage modulator capable of generating a nonlinearly-varying modulation voltage waveform is used as voltage modulator 320 to enable dynamic bias voltage source 302 to generate a non-linearly varying bias voltage.

The decrease in ground-referenced drive amplitude resulting from the use of transformer 360, combined with a decrease in coupling capacitance from the 500 pF of coupling capacitor 240 (FIG. 7) to the 7 pF inter-winding capacitance of transformer 360, substantially reduced the current injected into liner bias supply 170. This improved the accuracy of the mass measurements made using ion detection system 300, but the mass measurements were still lower in accuracy than those made using a conventional ion detection system.

Figure 13:
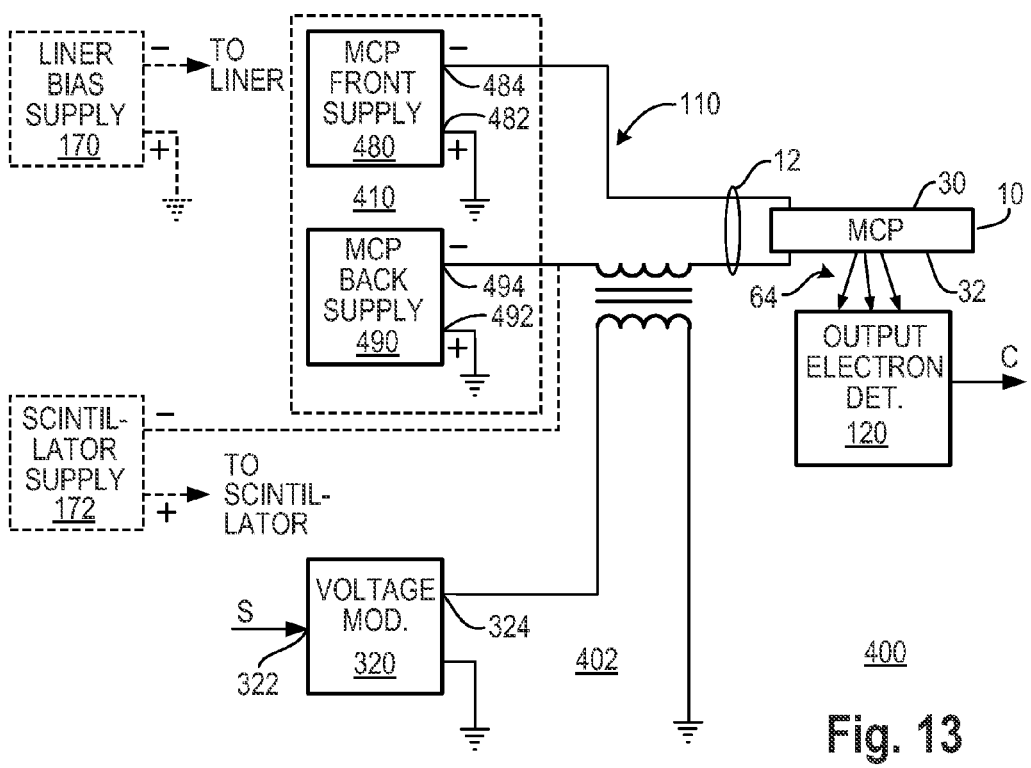
FIG. 13 is a block diagram showing another example of an ion detection system having a transformer-coupled dynamic bias voltage source.

Separating MCP bias supply 210 from the flight liner (not shown) of the host mass spectrometer (not shown) and from liner bias supply 170 further reduces the injection of current from microchannel plate 10 into the flight liner. FIG. 13 is a block diagram showing another example 400 of an ion detection system incorporating a transformer-coupled example 402 of a dynamic bias voltage source. Dynamic bias voltage source 402 differs from dynamic bias voltage source 302 in the configuration of its MCP bias supply. Elements of dynamic bias voltage source 402 that correspond to elements of dynamic bias voltage source 202 described above with reference to FIG. 7 and dynamic bias voltage source 302 described above with reference to FIG. 12 are indicated using the same reference numerals and will not be described again in detail. Dynamic bias voltage source 402 includes MCP bias supply 410, voltage modulator 320 and transformer 360.

In the example shown, MCP bias supply 410 is composed of an MCP front supply 480 and an MCP back supply 490. MCP front supply 480 has a positive terminal 482 and a negative terminal 484. MCP back supply 490 has a positive terminal 492 and a negative terminal 494. Positive terminals 482, 492 are both connected to ground. The negative terminal 484 of MCP front supply is connected to the front electrode 30 of microchannel plate 10 via the bias voltage input 12 of the microchannel plate. The secondary of transformer 360 couples the negative terminal 494 of MCP back supply 490 to the back electrode 32 of microchannel plate 10 via the bias voltage input 12 of the microchannel plate. The negative terminal 494 of MCP back supply 490 is additionally connected to the negative terminal of scintillator supply 172. In ion detection system 400, no high-voltage connection exists between the flight liner of the host mass spectrometer and MCP bias supply 410.

MCP front supply 480 is typically configured to generate a voltage substantially equal to that generated by liner bias supply 170 so that the flight liner (not shown) and the front electrode 30 of microchannel plate 10 are at substantially the same potential relative to ground. In other examples, MCP front supply 480 is configured to generate a voltage different from (typically less than) that generated by liner bias supply 170. MCP back supply 490 generates a voltage that differs from that generated by MCP front supply 480 by the average voltage shown in FIG. 5 so that the DC component of the voltage between electrodes 30 and 32 of microchannel plate 10 is equal to the average voltage.

Figure 14:
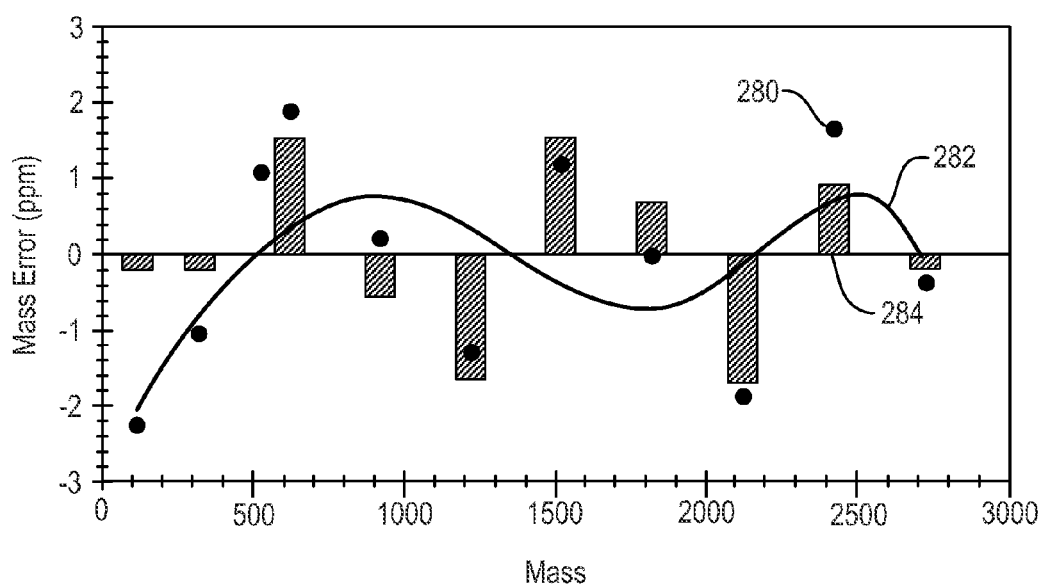
FIG. 14 is a graph showing the result of a mass calibration performed using the ion detection system shown in FIG. 13.

FIG. 14 is a graph showing the result of a mass calibration (similar to those described above with reference to FIGS. 10 and 11) performed using ion detection system 400 described above with reference to FIG. 13. In FIG. 14, errors (in parts per million) between the measured mass and the known mass of each ion species in the tuning mixture are shown by points, an exemplary one of which is shown at 280. FIG. 14 also shows a high-order polynomial mass calibration curve 282 generated from respective points 280. Finally, in FIG. 14, the residual errors between the measured masses corrected using the mass calibration curve and the respective known masses are shown by respective bars, an exemplary one of which is shown at 284. The residual errors are less than approximately ±1.7 ppm, and are sufficiently low for ion detection system 400 to be used in many applications.

In some embodiments of an ion detection system, the positive terminal 212 of MCP bias supply 210 (FIG. 7 or FIG. 12) or the negative terminal 494 of MCP back supply 490 (FIG. 13) is connected directly to the bias voltage input 12 of microchannel plate 10 and MCP bias supply 210 or MCP back supply 490 is configured as a variable-voltage supply that generates an output voltage waveform such as an output voltage waveform similar to that shown in FIG. 5. In an example in which MCP bias supply 210 or MCP back supply 490 is configured to generate an output voltage regulated by sampling a portion of the output voltage and comparing the output voltage sample with a reference voltage, a voltage modulator is used to impose a sawtooth waveform or another suitable waveform upon the reference voltage during each operating cycle of the ion detection system. The waveform imposed on the reference voltage imposes a corresponding waveform on the output voltage of MCP bias supply 210 or MCP back supply 490.

In the above-described examples of the ion detection system, dynamic bias voltage source 110 applies to the bias voltage input 12 of microchannel plate 10 a bias voltage that varies during the operating cycle of the ion detection system to reduce dependence of the gain of ion detector 90 on the velocity of the ions incident thereon. However, the gain of ion detector 90 depends not only on the gain of microchannel plate 10, but also depends on the gain of scintillator 130 and on the gain of photomultiplier tube 140. Scintillator 130 and photomultiplier tube 140 each have a respective gain that depends on an applied voltage.

Thus, in another embodiment of an ion detection system, scintillator 130 includes a bias voltage input and dynamic bias voltage source 110 applies to the bias voltage input of scintillator 130 a voltage that varies during the operating cycle to reduce dependence of the gain of ion detector 90 on the velocity of the ions incident thereon. In this embodiment, the varying voltage applied to the bias voltage input of scintillator 130 is applied between back electrode 32 and scintillator 130. To vary the gain of scintillator 130 sufficiently to provide an effective reduction in the dependence of the gain of ion detector 90 on the velocity of the ions incident thereon, dynamic bias voltage source 110 is configured to vary the voltage applied to the bias voltage input of the scintillator over a range of several kilovolts.

In yet another embodiment of an ion detection system, photomultiplier tube 140 has a bias voltage input, and dynamic bias voltage source 110 applies to the bias voltage input of photomultiplier tube 140 a voltage that varies during the operating cycle to reduce dependence of the gain of ion detector 90 on the velocity of the ions incident thereon. To vary the gain of photomultiplier tube 140 sufficiently to provide effective equalization of the gain of the ion detector, dynamic bias voltage source 110 is configured to vary the voltage applied to the bias voltage input of the photomultiplier tube over a range of several hundred volts.

Other embodiments of an ion detection system have more than one dynamic bias voltage source 110 and a corresponding number of bias voltage inputs. In an example, a first dynamic bias voltage source applies a varying voltage between the electrodes 30, 32 of microchannel plate 10, and a second dynamic bias voltage source applies a varying voltage between back electrode 32 and scintillator 130. However, in many applications, a single dynamic bias voltage source that applies a varying voltage to a bias voltage input coupled to the electrodes 30, 32 of microchannel plate 10 is sufficient.

Ion detection systems are described above with reference to examples suitable for detecting positive ions. Ion detection systems suitable for detecting negative ions are structurally identical to those described above, but the polarities of bias liner supply 170 (FIGS. 6, 7, 12, and 13), and MCP front supply 480 and MCP back supply 490 (FIG. 13) are reversed.

Exemplary Embodiments

In addition to the embodiments described elsewhere in this disclosure, exemplary embodiments include, without being limited to, the following.

In accordance with a representative embodiment, an ion detection system for detecting ions whose velocity varies during an operating cycle is disclosed. The ion detection system comprises a dynode electron multiplier comprising a bias voltage input, the dynode electron multiplier having, with a fixed bias voltage applied to the bias voltage input, a gain dependent on the velocity of ions incident thereon. The ion detection system also comprises a bias voltage source to apply to the bias voltage input of the dynode electron multiplier a bias voltage that varies during the operating cycle to reduce dependence of the gain of the dynode electron multiplier on the velocity of the ions incident thereon.

In some embodiments, the ion detection system of this invention comprises a continuous dynode electron multiplier.

In some embodiments, the ion detection system of this invention the continuous dynode electron multiplier constitutes part of a microchannel plate.

In some embodiments, the ion detection system of this invention the dynode electron multiplier comprises a conversion dynode and an electron multiplier. The electron multiplier is arranged to receive secondary particles emitted by the conversion dynode in response to ions incident thereon.

In accordance with another representative embodiment, an ion detection system for detecting ions whose velocity varies during an operating cycle is disclosed. The ion detection system comprises an ion detector comprising a bias voltage input, the ion detector having, with a fixed bias voltage applied to the bias voltage input, a gain dependent on the velocity of ions incident thereon. The ion detection also comprises a dynamic bias voltage source to apply to the bias voltage input of the ion detector a bias voltage that varies during the operating cycle to reduce dependence of the gain of the ion detector on the velocity of the ions incident thereon.

In some embodiments, in the ion detection system of this invention the bias voltage source is configured to vary the bias voltage during the operating cycle in accordance with the velocity of the incident ions.

In some embodiments, the ion detection system of this invention the bias voltage source is configured to increase the bias voltage in accordance with decreasing velocity of the incident ions.

In some embodiments, the ion detection system the ion detection system is to detect ions having a known dependence of velocity on time during the operating cycle, and the bias voltage source is configured to vary the bias voltage with time during the operating cycle.

In some embodiments, the ion detection system of this invention the ion detection system is to detect ions having a velocity that decreases with time during the operating cycle, and the bias voltage source is configured to increase the bias voltage with time during the operating cycle.

In some embodiments, the ion detection system of this invention the bias voltage source comprises a variable-voltage supply electrically connected to the bias voltage input.

In some embodiments, the ion detection system of this invention the bias voltage source comprises a constant-voltage power supply, and a voltage modulator interposed between the constant-voltage power supply and the bias voltage input.

In some embodiments, the ion detection system of this invention the voltage modulator is configured to generate a voltage that increases in magnitude with time during the operating cycle.

In some embodiments, the ion detection system of this invention the voltage modulator is configured to increase the magnitude of the voltage linearly with time during the operating cycle.

In some embodiments, the ion detection system of this invention the voltage modulator is configured to increase the magnitude of the voltage with time during the operating cycle dependent on a variation of incident ion velocity with time during the operating cycle and a dependence of gain on incident ion velocity.

In some embodiments, the ion detection system of this invention the voltage modulator is capacitively coupled to the bias voltage input.

In some embodiments, the ion detection system the voltage modulator is transformer coupled to the bias voltage input.

In some embodiments a mass spectrometer comprises an ion detection system of a representative embodiment described above.

In accordance with a representative embodiment, a method for detecting ions whose velocity varies during an operating cycle is disclosed. The method comprises-detecting ions using a dynode electron multiplier comprising a bias voltage input. The dynode electron multiplier has, with a fixed bias voltage applied to the bias voltage input, a gain dependent on the velocity of ions incident thereon. The method further comprises applying to the bias voltage input a bias voltage that varies during the operating cycle to reduce dependence of the gain of the dynode electron multiplier on the velocity of the ions incident thereon.

In some embodiments, the dynode electron multiplier of the method of this invention comprises a continuous dynode electron multiplier.

In some embodiments, the continuous dynode electron multiplier of the method constitutes part of a microchannel plate.

In some embodiments, the dynode electron multiplier of the method comprises a conversion dynode and an electron multiplier The electron multiplier is arranged to receive secondary particles emitted by the conversion dynode in response to ions incident thereon.

In accordance with a a representative embodiment, a method for detecting ions whose velocity varies during an operating cycle is disclosed. The method comprises detecting ions using an ion detector comprising a bias voltage input, the ion detector having, with a fixed bias voltage applied to the bias voltage input, a gain dependent on the velocity of ions incident thereon. The method also comprises applying to the bias voltage input a bias voltage that varies during the operating cycle to reduce dependence of the gain of the ion detector on the velocity of the ions incident thereon.

In some embodiments of the method, the applying comprises varying the bias voltage during the operating cycle in accordance with the velocity of the incident ions.

In some embodiments of the method, the applying comprises increasing the bias voltage in accordance with decreasing velocity of the incident ions.

In some embodiments, the method is to detect ions having a known dependence of velocity on time during the operating cycle; and the applying comprises varying the bias voltage with time during the operating cycle.

In some embodiments, the method is to detect ions having a velocity that decreases with time during the operating cycle; and applying comprises increasing the bias voltage with time during the operating cycle.

In some embodiments, the applying comprises a electrically connecting a variable-voltage supply to the bias voltage input.

In some embodiments of the method, the applying comprises: coupling a source of a substantially constant voltage to the bias voltage input; and imposing a voltage modulation on the bias voltage input.

In some embodiments of the method, the imposing comprises imposing on the bias voltage input a voltage that increases in magnitude with time during the operating cycle.

In some embodiments of the method, the imposing comprises imposing on the bias voltage input a voltage whose magnitude increases linearly with time during the operating cycle.

In some embodiments of the method, the imposing comprises imposing on the bias voltage input a voltage whose magnitude increases with time during the operating cycle dependent on a variation of incident ion velocity with time during the operating cycle and a dependence of gain on incident ion velocity.

In some embodiments of the method, the imposing comprises capacitively coupling the voltage modulation to the bias voltage input.

In some embodiments of the method, the imposing comprises transformer coupling the voltage modulation to the bias voltage input.

This disclosure describes the invention in detail using illustrative embodiments. However, the invention defined by the appended claims is not limited to the precise embodiments described.

We claim:

1. An ion detection system for detecting ions whose velocity varies during an operating cycle, the ion detection system comprising:
   a dynode electron multiplier comprising a bias voltage input, the dynode electron multiplier having, with a fixed bias voltage applied to the bias voltage input, a gain dependent on the velocity of ions incident thereon; and
   a bias voltage source to apply to the bias voltage input of the dynode electron multiplier a bias voltage that varies during the operating cycle to reduce dependence of the gain of the dynode electron multiplier on the velocity of the ions incident thereon.

2. The ion detection system of claim 1, in which the bias voltage source is configured to increase the bias voltage in accordance with decreasing velocity of the incident ions.

3. The ion detection system of claim 1, in which:
the ion detection system is to detect ions having a known dependence of velocity on time during the operating cycle; and
the bias voltage source is configured to vary the bias voltage with time during the operating cycle.

4. The ion detection system of claim 3, in which:
the ion detection system is to detect ions having a velocity that decreases with time during the operating cycle; and
the bias voltage source is configured to increase the bias voltage with time during the operating cycle.

5. The ion detection system of claim 1, in which the bias voltage source comprises a variable-voltage supply electrically connected to the bias voltage input of the dynode electron multiplier.

6. The ion detection system of claim 1, in which the bias voltage source comprises:
a constant-voltage power supply; and
a voltage modulator interposed between the constant-voltage power supply and the bias voltage input of the dynode electron multiplier.

7. The ion detection system of claim 6, in which the voltage modulator is configured to generate a voltage that increases in magnitude with time during the operating cycle.

8. The ion detection system of claim 6, in which the voltage modulator is configured to increase the magnitude of the voltage with time during the operating cycle dependent on a variation of incident ion velocity with time during the operating cycle and a dependence of gain of the dynode electron multiplier on incident ion velocity.

9. The ion detection system of claim 6, in which the voltage modulator is capacitively coupled to the bias voltage input.

10. The ion detection system of claim 6, in which the voltage modulator is transformer coupled to the bias voltage input.

11. The ion detection system of claim 1, in which the dynode electron multiplier comprises a continuous dynode electron multiplier.

12. The ion detection system of claim 11, in which the continuous dynode electron multiplier constitutes part of a microchannel plate.

13. The ion detection system of claim 1, in which the dynode electron multiplier comprises a conversion dynode and an electron multiplier, the electron multiplier arranged to receive secondary particles emitted by the conversion dynode in response to ions incident thereon.

14. An ion detection system for detecting ions whose velocity varies during an operating cycle, the ion detection system comprising:
an ion detector comprising a bias voltage input, the ion detector having, with a fixed bias voltage applied to the bias voltage input, a gain dependent on the velocity of ions incident thereon; and
a dynamic bias voltage source to apply to the bias voltage input of the ion detector a bias voltage that varies during the operating cycle to reduce dependence of the gain of the ion detector on the velocity of the ions incident thereon.

15. The ion detection system of claim 14, in which the bias voltage source is configured to increase the bias voltage in accordance with decreasing velocity of the incident ions.

16. The ion detection system of claim 14, in which:
the ion detection system is to detect ions having a known dependence of velocity on time during the operating cycle; and
the bias voltage source is configured to vary the bias voltage with time during the operating cycle.

17. The ion detection system of claim 16, in which:
the ion detection system is to detect ions having a velocity that decreases with time during the operating cycle; and
the bias voltage source is configured to increase the bias voltage with time during the operating cycle.

18. A mass spectrometer, comprising the ion detection system of claim 14.

19. A method for detecting ions whose velocity varies during an operating cycle, the method comprising:
detecting ions using an ion detector comprising a bias voltage input, the ion detector having, with a fixed bias voltage applied to the bias voltage input, a gain dependent on the velocity of ions incident thereon; and
applying to the bias voltage input a bias voltage that varies during the operating cycle to reduce dependence of the gain of the ion detector on the velocity of the ions incident thereon.

20. The method of claim 19, in which the applying comprises increasing the bias voltage in accordance with decreasing velocity of the incident ions.

* * * * *